United States Patent
Gruber et al.

(10) Patent No.: US 12,455,186 B2
(45) Date of Patent: Oct. 28, 2025

(54) SYSTEM AND METHOD FOR PHENOTYPING OF ORGANISMS

(71) Applicant: KWS SAAT SE & Co. KGaA, Einbeck (DE)

(72) Inventors: Benjamin David Gruber, Einbeck (DE); Harald Aigner, Einbeck (DE); Hanna Wildhagen, Gottingen (DE); Sabine Gubatz, Dassel (DE)

(73) Assignee: KWS SAAT SE & Co. KGaA, Einbeck (DE)

( * ) Notice: Subject to any disclaimer, the term of this patent is extended or adjusted under 35 U.S.C. 154(b) by 515 days.

(21) Appl. No.: 17/619,705

(22) PCT Filed: Jun. 23, 2020

(86) PCT No.: PCT/EP2020/067537
§ 371 (c)(1),
(2) Date: Dec. 16, 2021

(87) PCT Pub. No.: WO2020/260304
PCT Pub. Date: Dec. 30, 2020

(65) Prior Publication Data
US 2022/0307890 A1     Sep. 29, 2022

(30) Foreign Application Priority Data
Jun. 24, 2019    (EP) .................................. 19182091

(51) Int. Cl.
*G01G 19/02*       (2006.01)
*A01G 9/24*         (2006.01)
(Continued)

(52) U.S. Cl.
CPC ......... *G01G 19/02* (2013.01); *G01N 21/3563* (2013.01); *G01N 33/0098* (2013.01); *A01G 9/247* (2013.01)

(58) Field of Classification Search
CPC .. G01G 19/02; G01G 19/021; G01N 21/3563; G01N 33/0098; A01G 9/247
See application file for complete search history.

(56) References Cited

U.S. PATENT DOCUMENTS

| | | | | |
|---|---|---|---|---|
| 5,212,906 A | * | 5/1993 | Okuno | A01G 31/02 47/62 N |
| 6,168,840 B1 | * | 1/2001 | Johnstone | A01G 13/33 47/29.1 |

(Continued)

FOREIGN PATENT DOCUMENTS

| | | |
|---|---|---|
| DE | 10 2018 006 178 A1 | 4/2019 |
| WO | 2012/042084 A1 | 4/2012 |
| WO | 2012/148676 A1 | 11/2012 |

OTHER PUBLICATIONS

International Search Report and Written Opinion issued in PCT/EP2020/067537 dated Aug. 14, 2020.

(Continued)

*Primary Examiner* — Natalie Huls
(74) *Attorney, Agent, or Firm* — Troutman Pepper Locke LLP

(57) ABSTRACT

The invention relates to a phenotyping system (1), comprising a plant unit (11) having one or more plants (17), a growing area (5), a measurement area (7), a sensor (73) located in the measurement area (5) for acquiring phene-data related to phenes of the plants (17), wherein the phenotyping system (1) is adapted to transport the plant unit (11) to the measurement area (5). The phenotyping system (1) is characterized by at least one weighing vehicle (49) comprising a weighing unit (66) for acquiring weight-data related to a weight of the plant unit (11). The invention further relates to a method for phenotyping of plants with a phenotyping (Continued)

system (1) in a second aspect and to a computer program for operating a phenotyping system (1) in a third aspect of the invention.

20 Claims, 4 Drawing Sheets

(51) Int. Cl.
*G01N 21/3563* (2014.01)
*G01N 33/00* (2006.01)

(56) References Cited

U.S. PATENT DOCUMENTS

| | | | | |
|---|---|---|---|---|
| 8,584,397 | B1* | 11/2013 | Marsh | A01G 27/005 47/79 |
| 9,516,820 | B1* | 12/2016 | Logsdon | A01G 27/003 |
| 2002/0088171 | A1* | 7/2002 | Shepherd | A01G 9/16 47/17 |
| 2012/0260569 | A1 | 10/2012 | Golgotiu et al. | |
| 2013/0008085 | A1* | 1/2013 | Aikala | A01C 1/00 250/492.1 |
| 2018/0359939 | A1* | 12/2018 | Millar | G01G 19/393 |
| 2018/0359974 | A1* | 12/2018 | Millar | G01N 5/02 |
| 2019/0000019 | A1* | 1/2019 | Alexander | A01G 9/02 |
| 2019/0021238 | A1* | 1/2019 | Alexander | B25J 19/023 |
| 2020/0012852 | A1* | 1/2020 | Ding | G06V 20/00 |
| 2020/0037522 | A1* | 2/2020 | DeJarnette | A01G 27/003 |

OTHER PUBLICATIONS

Dauzat et al., "Automate De Phenotypage Pour Cultiver Des Plantes a Des Etats Hydriques Du Sol Controles", Cah. Techn. I.N.R.A., 2004, vol. 53, pp. 21-33, Retrieved from the Internet: https://www6.inra.fr/cahierdestechniques/content/download/4351/42397/version/1/file/CT53 (In French listed in International Search Report).

* cited by examiner

SYSTEM AND METHOD FOR PHENOTYPING OF ORGANISMS

CROSS-REFERENCE TO RELATED APPLICATIONS

This application is a U.S. National Phase of International Patent Application No. PCT/EP2020/067537, filed on Jun. 23, 2020, which claims priority to European Application No. 19182091.9, filed Jun. 24, 2019. The entire contents of these applications are incorporated herein by reference in their entirety.

The invention relates to a phenotyping system for phenotyping of plants, comprising at least one plant unit having one or more plants, a growing area, a measurement area separated from the growing area, a sensor located in the measurement area configured to acquire phene-data related to phenes of the one or more plants of the at least one plant unit, and a main controller for receiving and processing the phene-data, wherein the phenotyping system is adapted to transport the plant unit to the measurement area. The invention further relates to a method for phenotyping of plants using a phenotyping system and a computer program.

In recent years, significant progress was made in molecular and genetic tools for plant breeding. However, the functional plant body is formed during plant growth and depends on its genotype as well as its physical environment. Interaction between environmental conditions and the plants genotype determine the performance and productivity of the plant. To understand these interactions, the observable traits of plants known as the phenes are measured. Preferably, the phenes of the plants are measured from multiple directions using multiple sensors or cameras. To improve the consistency and throughput of the measurements it is known to use dedicated phenotyping systems. Such phenotyping systems are for example widely used in the development of new grain varieties. To further improve measurement accuracy, it is often desired to control the environmental conditions during the phenotyping process.

A phenotyping system is for example known from DE 10 2018 006 178 A1. The system comprises a sensor area for positioning multiple sensors, a measurement area for positioning a plant, and a gripping device configured to transport a sensor from said sensor area to said measurement are. However, the system is developed for lab conditions, limited quantities and small plants.

Another known phenotyping systems is the Conveyor Scanalyzer of LemnaTec GmbH from Aachen, Germany. It represents a medium scale phenotyping system for use in greenhouses, growth rooms, climate chambers or other indoor facilities. Plants are contained in pots and positioned on a conveyor system. The conveyor system transports the plants from a growth area to a measurement area, wherein multiple sensors are used to measure the phenes of the plant from multiple directions. Conveyor loops can be used for weighing and/or watering of the plants. It is often desirable to measure a weight of the plants in order to determine the amount of water contained in the pot. Since the conveyor system is used, temporal resolution of the weight measurement and the measurement of the plant phenes are equal. Thus, it is not possible to measure the weight of the plant at a higher temporal resolution than the phenes of the plant. Generally, in greenhouse scale phenotyping systems the main phenes of a plant are measured about once or twice a day.

However, it is desirable to determine the weight of the plant at a higher temporal resolution in order to deduce information about the plants transpiration and its state of drought. Furthermore, the use of the conveyor belt renders the design of the system inflexible. For example, it is not possible to phenotype certain plants more frequently than other plants on the same conveyor or to quickly change the layout of the phenotyping system. Changes to the research object are therefore usually cost-intensive.

Another available phenotyping system is a combination of the Planteye sensor and the Drought Spotter available from Phenospex B.V., Heerlen, The Netherlands. Plants are positioned in pots and placed on individual scales, configured to continuously measure the weight of the plants and therefore assessing water consumption of the plant. The Planteye sensor is placed on a mobile gantry, moved between the plants and used to measure the plants phenes from above. However, the system is not able to image plants under controlled and uniform conditions as they are provided in a dedicated measurement area. For example, it is not possible to control the lighting conditions and the plants can only be imaged or measured in a top-view or at certain angles, while due to excessive space requirements measurements from a side-view are not possible. Since a separate scale is used for each plant, procurement cost is high for large plant quantities.

A comparable system is known from EP 2 696 670 B1. The system comprises a plurality of plants in pots as well as an upper and lower movable gantry. The lower gantry is positioned below the pots and configured to measure the weight of a pot by lifting it. The upper gantry is positioned above the plants and comprises a sensor to acquire data related to said plants. However, the system is not configured to measure the weight of a plant at an individual temporal resolution and the sensor can only conduct measurements from one direction. Furthermore, it is not possible to control the environmental conditions during the measurements.

An object of the present invention therefore is to provide a flexible phenotyping system which allows for high accuracy measurements of plant phenes and independent weight measurement of the plants.

To solve this object, the present invention proposes at least one weighing vehicle comprising a weighing unit for acquiring weight-data related to a weight of the at least one plant unit. Acquiring weight-data related to a weight of the plant unit can also be referred to as weighing of a plant unit. By using at least one weighing vehicle it is possible to acquire weight-data related to the weight of the at least one plant unit independently of a phene-data acquisition by the sensor in the measurement area. It is possible to derive the weight of the plant unit from the weight-data related to the weight of the plant unit. If the system comprises multiple plant units, weight-data related to the weight of the plant unit can be acquired by the weighing vehicle individually for every plant unit at different time intervals. Since weight-data related to a weight of the at least one plant unit is acquired individually a measurement sequence is flexible. This is for example preferred if the phenotyping system comprises plants of different species and multiple plant units. Furthermore, it is preferred that the phenotyping systems comprises multiple weighing vehicles.

The invention relates to a non-field phenotyping system with individual plant units comprising one or more plants. Preferably, the plants to be phenotyped using the phenotyping system are members of one of the species selected from the group consisting of: *Hordeum vulgare, Hordeum bulbusom, Sorghum bicolor, Saccharum officinarium, Zea mays, Setaria italica, Oryza minuta, Oryza sativa, Oryza australiensis, Oryza alta, Triticum aestivum, Secale cereale,*

*Malus domestica, Brachypodium distachyon, Hordeum marinum, Aegilops tauschii, Daucus glochidiatus, Beta vulgaris, Daucus pusillus, Daucus muricatus, Daucus carota, Eucalyptus grandis, Nicotiana sylvestris, Nicotiana tomentosiformis, Nicotiana tabacum, Solanum lycopersicum, Solanum tuberosum, Coffea canephora, Vitis vinifera, Erythrante guttata, Genlisea aurea, Cucumis sativus, Morus notabilis, Arabidopsis arenosa, Arabidopsis lyrata, Arabidopsis thaliana, Crucihimalaya himalaica, Crucihimalaya waffichii, Cardamine flexuosa, Lepidium virginicum, Capsella* bursa *pastoris, Olmarabidopsis pumila, Arabis hirsute, Brassica napus, Brassica oeleracia, Brassica rapa, Raphanus sativus, Brassica juncea, Brassica nigra, Eruca vesicaria* subsp. *sativa, Citrus sinensis, Jatropha curcas, Populus trichocarpa, Medicago truncatula, Cicer yamashitae, Cicer bijugum, Cicer arietinum, Cicer reticulatum, Cicer judaicum, Cajanus cajanifolius, Cajanus scarabaeoides, Phaseolus vulgaris, Glycine max, Astragalus sinicus, Lotus japonicas, Torenia fournieri, Allium cepa, Allium fistulosum, Allium sativum,* and *Allium tuberosum.*

A plant unit preferably comprises a container, such as a pot, comprising a predefined weight and/or volume of soil and/or substrate and one or more plants, preferably of the same species. The amount of soil and/or substrate is preferably large enough to provide stable conditions for experiments, including those relating to drought. Furthermore, the size of the container as well as the amount of soil and/or substrate can vary, dependent on the plant. The surface of the soil and/or substrate can be fully or partially covered with a soil cover. Thus a uniform background for phene-data acquisition using the sensor can be provided and/or water loss from the soil and/or substrate due to evaporation can be reduced. Preferably the container has holes in the base to allow water to enter and/or flow out. Furthermore, it is preferred that the container sits on a saucer to facilitate watering. The saucer can be constructed such that all water provided to the saucer flows to the base of the container. The container, the plants contained in the container, and the saucer are preferably mounted on a support. A height of the support can be adjustable. It should be understood that the term support is not limited to a plate with four legs. For example racks, frames or platforms are equally preferred. Multiple plants can be grown in a container. It is preferred that the plant unit further comprises one or more walls that are opaque, transparent, selectively transmissive for specific wavelengths of light and/or temporarily covered with an opaque material. Preferably, the one or more walls are arranged in and/or on the container. Such walls can be positioned to separate multiple plants of a single container. Additionally, the one or more walls can provide a uniform background for phene-data acquisition with the sensor in the measurement area. It is further preferred that the phenotyping system comprises multiple plant units. For example, the phenotyping system can comprise several hundred plant units placed in the growing area. It is further preferred that the phenotyping systems comprises multiple types of plant units varying in size of the container, plant species in the container, number of plants, support size, soil cover and/or state of growth of the one or more plants.

Preferably, the at least one plant unit is stored in the growing area in between phene-data acquisitions and/or weight-data acquisitions in the measurement area. Preferably, the one or more plants can conduct photosynthesis in the growing area. It is further preferred that artificial and/or natural light is provided to the plants in the growing area. Preferably, the phenotyping system comprises multiple plant units arranged in a matrix, wherein the plant units are arranged in rows and columns. A fixed position in the growing area can be assigned to each plant unit. It is also possible that the position of the plant unit in the growing area is randomized. The growing area may contain shelves for storing the one or more plant units. The measurement area is a subarea of the phenotyping system, wherein the physiological phenes of the one or more plants of the plant unit are measured. Preferably, the measurement area is located in a separated enclosure, housing or room. To improve lighting conditions, it is further preferred that natural light is partially or fully blocked from the measurement area. At least one sensor is located in the measurement area for acquiring phene-data related to phenes of the one or more plants, while the plant unit is placed in the measurement area. Preferably, the sensor is an optical sensor, particularly preferred an RGB sensor, spectral sensor, multispectral sensor, hyperspectral (imaging) sensor, near infrared (NIR) sensor, mid infrared (MIR) sensor, far infrared (FIR) sensor, fluorescence imaging sensor, thermography sensor and/or a camera.

For Example, a hyperspectral imaging sensor collects and processes information from across the electromagnetic spectrum for obtaining the electromagnetic spectrum for each pixel in an image of the one or more plants, with the purpose of identifying and detecting phenes. In particular, the hyperspectral imaging sensor can be integrated into a push broom scanner. The hyperspectral imaging sensor principle is based on dividing images into spectral bands, in particular dividing images into spectral bands that can be extended beyond the visible spectrum. Captured spectral data preferably have a high spectral resolution as well as wavelength accuracy and cover a wide range of wavelengths. The hyperspectral imaging sensor preferably measures contiguous spectral bands and captures the plants using a large portion of the electromagnetic spectrum. It is preferred that the hyperspectral imaging sensor encompasses wavelengths of more than 200 nm, 400 nm, 600 nm, 800 nm, 1000 nm, 1200 nm, 1400 nm, 1600 nm, 1800 nm, 2000 nm, 2200 nm or 2400 nm. it is also preferred that the hyperspectral imaging sensor encompasses wavelengths of up to 500 nm, 1000 nm, 1500 nm, 2000 nm or 2500 nm. Often phenes have unique fingerprints in the electromagnetic spectrum. Known as spectral signatures, these fingerprints enable identification of the phenes of the one or more plants. It is particularly preferred that the captured spectral data are high-resolution.

In a further embodiment using one or more infrared sensors to measure reflectance infrared spectral bands which are optionally combined with narrowband measurements, plant phenes related to plant stress can be remotely assessed. Plant stress conditions which impact plants may be, but not limited to, nutrient stress, water stress, insect damage and weed competition. Those of skill in the art will recognize that many such conditions exist, which can have an impact on plants. Further, infrared spectral bands can preferably be used for the determination of digestibility and ensilability of plant material.

Preferably, a multispectral sensor can be used in a measurement device. Such a measurement device may comprise a spectrograph imaging unit in combination with, for example, an industrial monochrome camera, so that the measurement device can take different reflectivity and spectral signatures of plants, in order to generate an accurate description of the leaf shape and geometry of the plant. A spectrograph imaging unit such as ImSpector produced by Specim may be used in combination with an industrial camera to generate a multispectral image from above of a plant.

It is further preferred that the phenotyping systems comprises multiple sensors located in the measurement area. Preferably, phene-data related to phenes relate to plant development, biomass, size, shape, photosynthetic parameters, content of compounds, concentration of compounds, physiological plant stress and/or plant transpiration can be acquired. For example, one such phene may be the stomatal change point which is a vapour pressure deficit at which the plant starts regulating its stomata closed. It is further preferred that phene-data related to phenes of the one or more plants can be measured from one or more angles on the horizontal and/or vertical axis. Therefore, plants may be placed on a turntable or transport system in the measurement area. For example, such a transport system can be a conveyor system or a robot. It is also possible that the sensor is movable in the measurement area in order to acquire phene-data from different directions and/or different distances from the one or more plants. Therefore, the sensor can be located on a movable gantry or on a robotic arm. Preferably, the measurement area has a length selected from a range of 3 m to 10 m, particularly preferred 6 m to 8 m, a width selected from a range of 2 m to 8 m, particularly preferred 3 m to 6 m, and/or a height selected from a range of 1 m to 5 m, particularly preferred 2 m to 4 m. Preferably the measurement area is separated from other areas of the phenotyping system, such as the growing area, by one or multiple walls, particularly preferred by an aluminium frame lined with sheeting. Preferably, the measurement area is accessible via one or more doors and/or gates. It is preferred that the doors and/or gates are automated. The sheeting can be provided to seal the measurement area from light. The outer surface of the walls of the measurement area may be white in order to limit a heating due to solar radiation. Preferably, the measurement area comprises a measurement background on an inside surface of the walls. The measurement background preferably is pure blue. It is further preferred that a remaining inside surface of the walls, which is not part of the measurement background, is black, particularly preferred matt black. A pure blue measurement background allows for a segmentation of plants from the background, while a black remaining inside surface limits light reflection in the measurement area. The measurement area may comprise a safety lighting system, which preferably is turned off during the acquisition of phene-data. It is further preferred that the measurement area includes a measurement lighting system for providing specific lighting conditions for the sensor. For an RGB sensor the measurement lighting system preferably is a LED lighting system with a specific spectrum. For a hyperspectral imaging sensor, the measurement lighting system preferably is a DC Halogen lighting system with a specific spectrum. For a fluorescence imaging sensor, the measurement lighting system preferably is a LED lighting system with a specific spectrum that may differ from the spectrum for an RGB sensor. It is further preferred that the measurement area comprises a reference unit for calibrating and/or controlling the sensor and/or the measurement lighting system. Preferably, the reference unit is a colour reference chart and/or a spectral reflectance standard for controlling changes in a light spectrum provided by the measurement lighting system. It is further preferred that the measurement area comprises a measurement controller for controlling the one or more sensors. It is also preferred that the one or more sensors are controlled by a main controller of the phenotyping system. A main controller of the systems may also control the one or more doors and/or gates.

It is preferred that the plant units are only located in the measurement area while the sensor acquires phene-data related to phenes of the one or more plants. Therefore, the phenotyping system is adapted to transport the plant unit to the measurement area. It is further preferred that the phenotyping system is also adapted to transport the plant unit away from the measurement area. For this purpose, the phenotyping system can comprise a transport system. For example, the plant units can be located on a conveyor loop and/or track system adapted to transport the plant units from the growth area to the measurement area and back to the growth area. Preferably, the plant units are transported individually, particularly preferred by a robot and/or automated vehicle.

It is desirable to acquire weight-data related to the weight of the at least one plant unit independently from the phene-date related to phenes of the one or more plants. Data acquisition cycles for weight-data related to the weight of the plant unit and phene-data related to phenes of the one or more plants can be designed independent from each other. Therefore, the phenotyping system comprises a weighing vehicle. The weighing vehicle is adapted to move to a position of the at least one plant unit. Preferably the weighing vehicle is steerable and has multiple wheels. It is further preferred that the weighing vehicle can rotate on the spot or can move omnidirectional. It is particularly preferred that the weighing vehicle is a low profile vehicle adapted to pass beneath the plant unit. Track-mounted vehicles or crane systems are also possible. It is preferred that the weighing vehicle is electrically driven and comprises a rechargeable battery. The weighing unit of the weighing vehicle is configured to acquire weight-data related to the weight of the plant unit. Preferably the weighing vehicle and/or the weighing unit is adapted to determine the weight of the plant unit from the acquired weight-data. The weighing unit can be an electrical weighing unit and/or an electromechanical weighing unit, preferably a load cell. It is also possible that the weighing vehicle comprises multiple weighing units. For example, this may be desirable in order to achieve a redundant system or to cover different measuring ranges.

In a first embodiment of the invention, the weighing vehicle is an automated vehicle. An automated vehicle is a driverless vehicle with an automated guidance system. An automated vehicle is preferably adapted to autonomously locate a plant unit, autonomously determine a route to a location, autonomously navigate to a location and/or autonomously acquire weight-data related to the weight of a plant unit. For example, an automated weighing vehicle could acquire weight-data related to the weight of a first plant unit, locate the position of a second plant unit, navigate to said second plant unit and acquire weight-data related to the second plant units' weight without human interaction. Preferably, the phenotyping system comprises guide paths for the automated vehicle. Such guide paths can for example be defined by a magnetic and/or optical marker. It is further preferred that the automated vehicle navigates independently of predefined guide paths. It is also preferred that the automated vehicles are navigated without guide paths. The weighing vehicle can be equipped with a controller, one or more sensors and/or one or more camera systems. The camera system and/or sensors can be used to determine a position of the weighing vehicle in the phenotyping system. Furthermore, the sensors and/or camera systems can locate obstacles. Preferably the automated vehicle is adapted to circumnavigate obstacles in its route. The automated weighing vehicle may comprise a safety system to avoid collisions with obstacles such as other vehicles, humans and/or plant units. It is further preferred that the phenotyping systems comprises a main controller and that the weighing vehicle comprises a communication unit, particularly preferred a wireless communication unit, adapted to communicate with said main controller of the phenotyping system. Such a main controller of the phenotyping systems is preferably configured to control multiple automated vehicles of the phenotyping system. It is preferred that the main controller of the phenotyping system sends a location of the next plant unit to be weighed to the respective weighing vehicle. The weighing vehicle preferably autonomously navigates to the location or is navigated to the locations by the main controller. Preferably the main controller is adapted to track one or more weighing vehicles, control traffic of multiple weighing vehicles and/or control and assign tasks for the one or more vehicles.

In some embodiments of the invention, the weighing vehicle is configured to transport the plant unit to the measurement area. Therefore, the weighing vehicle is preferably adapted to carry the plant unit to the measurement area. In a further preferred embodiment, the weighing vehicle is adapted to haul or push the plant unit to the measurement area. Since the weighing vehicle is used for transportation of the plant unit as well as for acquiring weight-data related to the weight of the plant unit an overall complexity of the phenotyping system can be reduced. A flexibility of the phenotyping system is increased. Preferably, weight-data related to the weight of the plant unit is acquired while the plant unit is transported to the measurement area. It should be understood that weight-data related to the weight of the plant unit can be acquired without transporting the plant unit to the measurement area. It is for example preferred that the weighing vehicle acquires multiple weight-data sets related to the weight of the plant unit before transporting the plant unit to the measurement area. Preferably only one type of weighing vehicle is used in the phenotyping system. Economies of scale can be achieved for phenotyping systems comprising multiple vehicles. For example, procurement costs and/or maintenance costs can be reduced. For small phenotyping systems it can be economical if only one weighing vehicle is needed. Preferably, the weighing vehicle is adapted to support the plant unit during a phene-data acquisition process in the measurement area. It is particularly preferred that the plant unit is supported by the weighing vehicle during the phene-data acquisition process. The weighing vehicle preferably continuously or stepwise rotates the plant unit in the measurement area.

In a further preferred embodiment, the phenotyping systems comprises at least one plant vehicle configured to transport the plant unit to the measurement area. The plant vehicle may have similar properties as described above for the weighing vehicle. Preferably, the plant vehicle is an automated vehicle. It is further preferred that the plant vehicle formed as a weighing vehicle without a weighing unit. Preferably, the main controller is adapted to track one or more weighing vehicles and/or plant vehicles, control traffic of multiple weighing vehicles and/or plant vehicles and/or control and assign tasks for the one or more weighing vehicles and/or plant vehicles.

In a preferred embodiment of the invention, the weighing vehicle is configured to selectively lift the plant unit in order to acquire weight-data related to the weight of said plant unit. In order to accurately acquire weight-data related to the weight of the plant unit it is preferred that the whole weight of the plant unit is supported by the weighing vehicle when the plant unit is lifted. Preferably, the plant unit is lifted from below, while the weighing vehicle is located between the ground and the plant unit. Preferably, the weighing vehicle comprises a liftable platform located at its top side, while the weighing unit is located between the liftable platform and a main body of the weighing vehicle. For example, a low profile weighing vehicle can drive below a support of the plant unit and lift said support from below using its liftable platform. It is also preferred that the weighing vehicle lifts the plant unit from above. Therefore, the weighing vehicle may comprise a grappler and/or a hook. In a further preferred embodiment, the weighing vehicle lifts the plant unit for transportation of the plant unit to the measurement area.

Preferably, the phenotyping system further comprises a condition control system for controlling one or more environmental conditions within the measurement area. Since environmental conditions can have an immediate effect on the measurable phenes of a plant it is desirable to control the environmental conditions within the measurement area. In order to provide constant measurement conditions a condition control system may be installed in the measurement area. This is especially advantageous if the phenotype of a greater quantity of plants is to be measured and/or if long term measurements shall be conducted. The environmental condition to be controlled by the condition control system preferably is one of light intensity, light spectra, air temperature, humidity, carbon dioxide concentration, air flow direction and/or velocity of an air flow in the measurement area. To provide controlled lighting conditions the condition control system may comprise one or multiple lamps, optical filters and/or different light diffusers. Preferably, the lamps provide light of a predefined spectrum or monochromatic light. Furthermore, it is preferred that the condition control system comprises an air condition unit adapted to cool or heat the air in the measurement area to a predefined temperature. Moreover, the condition control system can comprise one or more fans for inducing an air flow in the measurement area. In a particularly preferred embodiment the condition control system comprises a controller and at least one environmental sensor. Thus, the environmental control system may be adapted to autonomously regulate the environmental conditions in the measurement area to a predefined condition. It is desirable that the measurement area is located in a housing and/or enclosure in order to reduce environmental effects from outside the measurement area.

In a favoured embodiment, the phenotyping system further comprises an acclimatisation area for acclimatizing the one or more plants of the plant unit to acclimatisation conditions. Preferably, at least one acclimatisation condition in the acclimatisation area is similar to a corresponding environmental condition in the measurement area. Environmental conditions in the measurement area can differ from environmental conditions in other areas of the phenotyping system. For example, a temperature in a growth area can be higher than a corresponding temperature in the measurement area in order to increase rate of growth of the plants. Hence, if a plant is transported from the growth area to the measurement area reactions of the plant are possible. Furthermore, it is possible that the plant is exposed to relative wind during its transport which can also lead to reactions. Such reactions might have a negative influence on the validity of phene-data acquired by the sensor in the measurement area. Therefore, it is desirable to acclimatise the one or more plants to the environmental conditions of the measurement area. Since measurement time is limited it is not reasonable to acclimatise the plants inside the measurement area. Thus, an acclimatisation area is provided adjacent to the measurement area. It is preferred that the acclimatisation area is adjacent to the measurement area. Thereby effects on the plants caused by changes in the environmental conditions during the transport from the acclimatisation area to the measurement area can be avoided. Preferably, the plant units can be transported from the acclimatisation area directly to the measurement area. It is further preferred that at least one acclimatisation condition differs from a corresponding environmental condition in the measurement area. Preferably, the acclimatisation conditions induce a specific physiological process and/or state of the one or more plants before phene-data is acquired in the measurement area. For example, the one or more plants may be stored in the dark or under very high lighting conditions for a predefined period.

Preferably, the plant unit is placed in the acclimatisation area for at least a predetermined minimum time before it is transported to the measurement area. In order to achieve an acclimatisation effect a minimum holding time in the acclimatisation area is needed. This minimum time is dependent on the differences in the environmental conditions in the growing area and the measurement area of the phenotyping system and/or the time required to induce a specific physiological process and/or state. Furthermore, the required holding time depends on the transport speed during transportation of the plant unit to the acclimatisation area. Thus, it is preferred to choose the minimum time dependent on the environmental conditions in the growth area and the measurement area. It can also be preferred to define a constant minimum time that is chosen for a maximum expected difference in environmental conditions. Thus, a complexity of the system can be reduced.

In a favourable embodiment the phenotyping system further comprises an irrigation system, configured to irrigate the one or more plants with water and/or additives based at least on the weight-data related to the weight of the plant unit. It is preferred that the additives are one or more of, but not limited to: nutrients, salt, herbicides, fungicides, growth promoting agents, growth retarding agents, hormones and/or other chemical compounds. Preferably, the plants are irrigated to a defined irrigation regime which is based upon a set soil moisture, daily water availability, occurred water evaporation, and/or the irrigation regime of a reference plant. The weight-data related to the weight of the plant unit can be used to determine an amount of water contained in the soil and/or substrate. If a weighing time interval between consecutive weight-data acquisitions of the plant unit is chosen small enough, preferably less than 120 minutes, further preferred less than or equal to 60 minutes, particularly preferred less than or equal to 20 minutes, further preferred less than or equal to 10 minutes, it is also possible to derive a water evaporation from these measurements.

Preferably, the irrigation system is adapted to dose controlled amounts of water and/or additives to the plants of the plant unit. It is also preferred that the amount of water and/or additives is controlled via an irrigation time during which the water and/or additives are provided at a constant flow rate. It is preferred that the growing area is equipped with an individual irrigation point for every plant unit and that the plant units are positioned in the growing area such that the one or more plants can be irrigated with these irrigation points. It is further preferred that an automated vehicle transports water and/or additives to the plant units and doses a predefined amount to the plants. The overall number of plant transports occurring in the system can be reduced.

It is further preferred that weight-data related to the weight of the plant unit is acquired by the weighing unit of the weighing vehicle while the one or more plants of the plant unit are irrigated. Preferably, the plant unit is lifted by the weighing vehicle while the one or more plants are irrigated. From the weight-data related to the weight of the plant unit an amount of water and/or additives provided to the one or more plants can be calculated. The weight-data can be used to monitor an amount of water and/or additives dosed by the irrigation system. It is further preferred that the weighing vehicle can communicate with the irrigation system. For example, the weighing unit may send a start signal once an irrigation position is reached and a stop signal once a desired weight of the plant unit is reached. A metering unit is not necessary for the irrigation system if weight-data related to the weight of the plant unit is acquired while the one or more plants of the plant unit are irrigated. Preferably, the irrigation system is adapted to acquire irrigation-data. Irrigation-data may be related to a nutrient composition provided to a plant unit, amount and/or volume of water provided to a plant unit, amount of additives provided to a plant unit, a temperature of water provided to the plant unit, volume flow of water and/or additives provided to the plant unit, a timestamp and/or irrigation period.

In a further preferred embodiment irrigational parameters for irrigating the one or more plants are chosen based on the most recent weight-data acquired by the weighing vehicle related to the weight of the plant unit. Irrigational parameters of the irrigation system are at least one of: amount of water, volume of water, amount of additives, volume of additives, composition of additives, flow rate of water, flow rate of additives, temperature of water, temperature of additives. By choosing the irrigational parameters based on the most recent weight-data acquired by the weighing unit, no weighing vehicle needs to be present during an irrigation process. Therefore, a flexibility and/or cost efficiency of the phenotyping system can be increased. Preferably, the irrigation system comprises a metering unit for dosing predefined amounts of water and/or additives. Preferably, the weighing vehicle transmits the most recent weight-data related to the weight of the plant unit to the main controller of the phenotyping system. The main controller then determines the irrigational parameters based on the transmitted weight-data and controls the irrigation system such that it irrigates the one or more plants of the plant unit according to these irrigational parameters.

In a particularly preferred embodiment the plant unit is transported to the irrigation system for irrigating the one or more plants. The irrigation system is preferably stationary. This allows for a very flexible phenotyping system since the irrigation system can be used for different layouts of the system. For example, no changes in the irrigation system are needed if the size of the plant unit varies. It is not needed to transport water and/or additives to the one or more plants of the plant units which further reduces system complexity.

It is preferred that the plant unit is transported to the irrigation system with an irrigation vehicle. An irrigation vehicle may preferably have similar properties as described for the weighing vehicle and/or the plant vehicle. For example, the weighing vehicle and the irrigation vehicle can be low profile automated guide vehicles controlled by a main controller of the phenotyping system. It is further preferred that the plant unit is transported to the irrigation system with the weighing vehicle or the plant vehicle. Preferably, all vehicles of the phenotyping system have similar properties and are adapted to fulfil any of the tasks: acquiring weight-data related to the weight of the plant unit, transporting the plant unit to the measurement area, and transporting the plant unit to the irrigation system.

In one embodiment the phenotyping system further comprises at least one environmental sensor located in the growing area for measuring environmental conditions in the growing area. As the phenotype of a plant is defined by its genotype as well as the environmental conditions it is often desirable to measure the environmental conditions the plants are objected to during their growing period. For example, it is often necessary to simulate certain environmental conditions in the development of new plant species in order to predetermine a performance of the plants under conditions of use. Preferably, the environmental sensor is a temperature sensor, a humidity sensor, a carbon dioxide sensor, a light intensity sensor, a light spectra sensor, a radiation sensor, a net radiation sensor, an air flow sensor and/or a gas sensor, particularly preferred a carbon monoxide, carbon dioxide and/or nitrogen oxide sensor. It is further preferred that the phenotyping system comprises multiple environmental sensors at different subareas of the growing area.

It is preferred that an environmental sensor time interval is 30 minutes or less, particularly preferred 10 minutes or less. The environmental sensor time interval is the time interval between two consecutive measurements of the at least one environmental sensor at the same position in the growing area. An environmental sensor time interval in the desired range allows to analyse an effect of the environmental conditions on the one or more plants while limiting the amount of data to be processed.

In a further preferred embodiment, the at least one environmental sensor is movable in the growing area for measuring environmental conditions in multiple subareas of the growing area. For larger growing areas the environmental conditions can vary. Therefore, it is desirable to measure environmental conditions in multiple subareas of the growing area. Since purchase costs of sensors are an important factor in the overall cost of a phenotyping system it is desirable to limit an overall amount of sensors in the system while still allowing for data acquisition at high time resolutions. A movable environmental sensor can move between subareas of the growing area to conduct measurements of the environmental conditions. Preferably, the environmental sensor time interval between two consecutive measurements in the same subarea is 30 minutes or less, particularly preferred 10 minutes or less. In a particularly preferred embodiment the at least one environmental sensor is fixed to or hanging from a mobile gantry.

The mobile gantry is adapted to move the environmental sensor over the one or more plants contained in the plant units. For example, the mobile gantry moves the environmental sensor to a first subarea of the growing area and the environmental sensor measures the environmental conditions in this first subarea. After the measurement is finished the mobile gantry moves the environmental sensor to a second subarea of the growing area and a second measurement is conducted. After the second measurement is finished the gantry moves the environmental sensor to a third subarea and so on. When the environmental conditions in all subareas have been measured the gantry moves the environmental sensor to the first subarea and the process is repeated. It is further preferred that the phenotyping system comprises multiple movable environmental sensors. In a particularly preferred embodiment the environmental sensor is height-adjustable. For example, if plants at different states of growth are located in the growing area a height of the plants and consequently a distance between the plant and the environmental sensor may vary. Using a height-adjustable sensor a measurement distance between the one or more plants of a unit and the environmental sensor can be kept constant.

In a preferred embodiment the phenotyping system is located in one or more greenhouses, growth rooms and/or climate chambers with controlled environmental conditions. The greenhouse, growth rooms and/or climate chambers can comprise a climate control system for controlling temperature, humidity, light levels, light composition, air flow rates and/or carbon dioxide concentration. It is preferred that the phenotyping system is located in multiple greenhouses, growth rooms and/or climate chambers with similar or different environmental conditions. For example, the phenotyping system can have a single measurement area located in a first greenhouse. In the first greenhouse a first plant species is grown in plant units. A second plant species is grown in a second greenhouse under different environmental conditions. For phenotyping of plants of the second species, these plants are transported to the measurement area in the first greenhouse and back to the second greenhouse once phene-data has been acquired. This allows for an effective and flexible system. Preferably, the one or more weighing vehicle, plant vehicle and/or irrigation vehicle are shared between multiple greenhouses, growth rooms and/or climate chambers.

In a preferred embodiment of the invention the phenotyping system is configured to acquire weight-data related to the weight of the plant unit at a weighing time interval, to acquire phene-data related to phenes of the one or more plants of said plant unit at a sensor acquisition time interval and wherein the weighing time interval is equal to or shorter than the sensor acquisition time interval. The weighing time interval is a time interval between two consecutive acquisitions of weight-data related to the weight of the same plant unit. In a similar manner the sensor acquisition time interval is a time interval between two consecutive acquisitions of phene-data related to the one or more plants of the plant unit by the sensor in the measurement area. The growth rate of plants is generally slow. Thus it is often sufficient to acquire phene-data related to the phenes of a plant 1 to 6 times a day, preferably 1 to 3 times a day, if a long term performance of a plant is analysed.

However, water related processes like a rate of transpiration of the plants and/or stage of drought can have significant effects on the measurable phenotype of the plants. Transpiration in the present context is understood as evaporation of water from the plant, which is preferably measured in millilitres or grams of water per hour. Preferably, the transpiration is related to a leaf area of the one or more plants. It is further preferred that an evaporation of water from the plant is related to phene-data acquired in the measurement, particularly preferred phene-data acquired by a RGB sensor.

Thus, if information about these water related processes is available an overall accuracy of the phenotyping process can be increased. For example, it is possible to measure photosynthesis-related phenes and relate these to a transpiration of the plant occurring at the time of phene-data acquisition in the measurement area. To acquire information about water related processes high time resolution measurements are needed. Information about the transpiration of a plant can be derived from a time dependent development of the weight of the plant unit. Therefore, a weighing time interval is needed that is equal to or shorter than a sensor acquisition time interval. Furthermore, a state of drought may be monitored when information about water related processes is available. The stage of drought indicates how progressed a drought stress of the one or more plants is. Drought stress is induced to plants if an amount of water available to the plant is lower than an optimum amount of water needed by the plant. In reaction to limited water supply the phenes of the one or more plants change. For example, light drought stress might see root growth increased to explore for more water, after a period of time when no more water was found a leaf water content starts decreasing, which then causes differences in leaf morphology. Preferably the effects of drought stress on the phenes of a plant are monitored over time, for example once a day. To monitor a state of drought it is preferred to relate the weight-data of the plant to phene-data such as, but not limited to: biomass of the one of more plants, leaf area of the one or more plants, width of the one or more plants, height of the one or more plants, leaf morphology, fine and/or crown root phenes, content of chlorophyll, content of anthocyanin, content of nitrogen, content of water in the one or more plants and/or photosynthesis related phenes such as electron transfer rate, non-photochemical quenching, quantum yield, stomatal change point value, leaf temperature difference to air. The stomatal change point value being a vapour pressure deficit at which stomatal conductance is regulated. It is therefore preferred to relate the phene-data acquired in the measurement area to the weight-data acquired by the weighing vehicle, and preferably also to the environmental conditions in the growing area. Such environmental conditions preferably are: air temperate, relative humidity, photosynthetically active radiation, light spectra, growing degree days, vapour pressure deficit. For example, a water use efficiency of the one or more plants, calculated from an amount of water used per gram of biomass, or a critical soil water content can be determined. The critical soil water content being a soil moisture level at which a predefined plant phene becomes affected. The amount of water available to the one or more plants can be derived from a weight of the plant unit. For example, a soil water content can be calculated by subtracting a calculated shoot and root biomass, which is preferably calculated from the phene-data, a weight of the container, a weight of the support and a mass of dry soil from an overall weight of the plant unit.

In a particularly preferred embodiment, the weighing time interval is 60 minutes or less, preferably 20 minutes or less, particularly preferred 10 minutes or less. Such a weighing time interval allows to draw accurate conclusions on the transpiration of the plant and/or the state of drought while limiting the overall amount of data to be processed.

It is preferred that the at least one weighing vehicle is configured to transmit the acquired weight-data related to the weight of the plant unit to said main controller. The main controller can be adapted to receive and store the weight-data related to weight of the plant unit. In a particularly preferred embodiment the weighing vehicle is adapted to transmit the acquired weight-data related to the weight of the plant unit wirelessly. If the acquired weight-data is transmitted wirelessly an efficiency of the system can be increased since it is not necessary, that the weighing vehicle travels to a transmission point after acquiring the weight-data.

It is further preferred that the main controller is configured to receive and process phene-data acquired by the sensor in the measurement area, weight-data related to the weight of the plant unit, irrigation-data acquired by the irrigation system, and data from the environmental sensor. Preferably, the main controller is adapted to relate the acquired data to each other. Thus, a database for the one or more plants is created. Such a database allows for an interpretation of the phenes of the one or more plants. Preferably, the main controller receives all data acquired for the plant unit. It is further preferred that the main controller is configured to receive weight-data from multiple weighing units, multiple irrigation systems, multiple environmental sensors and/or multiple sensors located in the measurement area. It is also possible that the main controller is adapted to control the weighing vehicle, plant vehicle, irrigation vehicle, environmental sensor, irrigation system and/or the sensor in the measurement area.

In further development of the invention the main controller is configured to calculate a water consumption of the one or more plants of the plant unit at least based on the irrigation-data acquired by the irrigation system, and the weight-data related to the weight of the plant unit. Preferably, the main controller is configured to process the data such that information about a state of drought of the one or more plants and/or about the transpiration of the one or more plants can be derived from the calculated water consumption. If direct evaporation of water is neglected, the water consumption of the one or more plants can for example be determined in a simplified manner from a difference in weight between two consecutive weight measurements of the plant unit.

According to a second aspect of the invention the above stated object is solved by a method for phenotyping of plants using a phenotyping system, the method comprising: acquiring weight-data related to a weight of a plant unit with a weighing vehicle, transporting the plant unit from a first location in a growing area to a measurement area, and acquiring phene-data related to phenes of one or more plants of a plant unit in the measurement area. Preferably, a phenotyping system according to the first aspect of the invention is used. It is preferred that the step acquiring weight-data related to the weight of the plant unit with a weighing vehicle is executed multiple times. The step transporting the plant unit from a first location in the growing area to a measurement area is preferably performed using a weighing vehicle and/or a plant vehicle. Preferably, the weighing vehicle and/or the plant vehicle are automated vehicles as described for the first aspect of the invention. Preferably, the plant unit is supported by the weighing vehicle and/or the plant vehicle while phene-data related to the one or more plants of the plant unit is acquired by a sensor in the measurement area. It is further preferred that the weighing vehicle stepwise rotates around its own axis during the phene-data acquisition in order to allow for phene-data acquisition from multiple angles.

In one embodiment the step transporting the plant unit from a first location in a growing area to a measurement area comprises: transporting the plant unit from the first location in a growing area to an acclimatization area; holding the plant unit in the acclimatization area for an acclimatization period, and transporting the plant unit from the acclimatization area to the measurement area. After being held in the acclimatization area for the acclimatization period the plant is transported to the measurement area. For example, it is preferred that the plant unit is transported to the acclimatization area by the weighing vehicle and parked there for the acclimatization period. After the acclimatization period is over, the same or another weighing vehicle and/or plant vehicle transports the plant unit to the measurement area. The acclimatization period preferably is chosen from a range of more than 0 to 60 minutes, further preferred 5 to 30 minutes, particularly preferred 5 to 20 minutes.

In some embodiments the method further comprises: transporting the plant unit from the measurement area to the first location or a second location in the growing area. It is preferred that the plant unit is transported from the measurement area using the same transport system that was used to transport the plant unit to the measurement area. Preferably, the transport systems is either the weighing vehicle or the plant vehicle. For example, it is possible that the plant unit is transported to the measurement area by a plant vehicle, held by the plant vehicle during phene-data acquisition, and then transported back to the growing area by the same plant vehicle. If the plant unit is transported to the first location, a position of the plant unit in the growing area is constant and thus the one or more plants of the plant unit are subjected to constant conditions. If a position of the plant units in the growing area is constant it is possible to apply a correction factor to the phene-data. Such a correction factor may account for spatial heterogeneity, such as temperature variations, in the growing area. However, it can also be preferred that the plant unit is transported to the second location which differs from the first location. Preferably, the second location is chosen randomly and the second location is saved in a main controller of the phenotyping system. Thus, plant units may or may not be randomised in the growing area. By randomising a location of the plant units in the growing area effects caused by environmental conditions varying in the growing area are harmonised. Thus, effects of spatial heterogeneity and/or neighbouring plants on the one or more plants of a plant unit can be minimized.

In an embodiment the method further comprises: transporting the plant unit from the growing area to an irrigation system, irrigating the one or more plants of the plant unit, acquiring irrigation-data, and transporting the plant unit from the irrigation system to the growing area. When fertilisation and/or irrigation is required a transport system conveys the plant unit to the irrigation system. Whether irrigation or fertilisation is required can be determined by a predefined experimental plan, based on the acquired weight-data related to the weight of the plant unit and/or by a user of the phenotyping system. The transport system preferably is a weighing vehicle, a plant vehicle, and/or an irrigation vehicle. Preferably, irrigation-data is saved to a main controller and/or in relation to the plant unit. After the irrigation process is finished the plant unit is transported back to the growing area. It is preferred that a location in the growing area is chosen randomly and that the location is then saved. Preferably, the location is saved in the main controller. It is also preferred that a fixed location is assigned to each plant unit and that each plant unit is returned to the fixed location after the irrigation process.

In a further embodiment the method comprises: measuring environmental conditions in the growing area. Preferably, the environmental conditions are measured using a environmental sensor. The environmental sensor can be configured to move to predefined subareas of the growing area. Preferably, data acquired by the environmental sensor is sent to a main controller and saved together with a time and location of the measurement. In a particularly preferred embodiment the environmental sensor successively measures the environmental conditions of multiple subareas of the growing area.

It is further preferred that the method comprises the step: calculating a transpiration of the one or more plants of the plant unit at least based on the irrigation-data and the weight-data. Preferably, also phene-data acquired by the sensor in the measurement area is taken into account for the calculation process. For calculating the transpiration of the plant water consumption of the plant for growth, metabolism and/or guttation is preferably neglected. It is also preferred that an amount of water used for metabolism or growth of the one or more plants is calculated from the phene-data acquired in the measurement area. This amount of water used for metabolism or growth can then be used to calculate the transpiration of the one or more plants. The transpiration of the plant is preferably expressed in millilitres or grams of water per hour. Preferably, a soil water content at a certain time is calculated by subtracting a weight of the container, the support, the dry soil and/or substrate and the biomass of the one or more plants from an overall weight of the plat unit. The transpiration is then preferably calculated by subtracting the soil water content calculated at a second point in time from the soil water content calculated at a first point in time and dividing the result by the time period between the first and second point in time.

In a further development the method further comprises: measuring an environmental condition in the growing area, determining at least one phene of the one or more plants of the at least one plant unit based on the phene-data and the measured environmental conditions, and temporally associating the determined phenes with the calculated transpiration of the plant. Therefore, it is possible to temporally relate biological phenes with current climate at the position that the plant was growing, with the level of transpiration the one or more plants are experiencing at the point in time when phene-data related to the plant was acquired in the measurement area and/or the transpiration the one or more plants have experienced during a time interval previous to the phene-data acquisition.

Preferably, the step acquiring weight-data related to a weight of a plant unit with a weighing vehicle is executed at a higher or equal temporal resolution than the steps: transporting the plant unit from a first location in the growing area to a measurement area, and acquiring phene-data related to the one or more plants of a plant unit in the measurement area. The temporal resolution refers to the number of executions of the step per time unit. It is not related to the cycle time of the step which describes the time between the start and finish of the step to be executed. If a step is executed at a higher temporal resolution than another step it is executed at a higher frequency than the other step. In a preferred embodiment the temporal resolution of the step acquiring weight-data related to the weight of the plant unit with the weighing vehicle is 60 minutes or less, preferably 20 minutes or less, particularly preferred 10 minutes or less. Thus, weight-data related to the weight of the plant unit is acquired by the weighing vehicle at least every 10 minutes.

According to a third aspect of the invention the above stated problem is solved by a computer program for operating a phenotyping system according to the first aspect of the invention, the computer program comprising program code means for causing the system to carry out the steps of the method according to the third aspect of the invention when the computer program is run on a computer controlling the phenotyping system.

It should be understood that the phenotyping system according to the first aspect, the method according to the second aspect, and the computer program according to the third aspect of the invention can have similar or equal aspects, in particular as they are described in the dependent claims. Reference is made to the above description of the phenotyping system according to the first aspect of the invention as well as to the above description of the method for phenotyping of plants according to the second aspect of the invention.

For a more complete understanding of the invention, the invention will now be described in detail with reference to the accompanying drawings. The detailed description will illustrate and describe what is considered as a preferred embodiment of the invention. It should of course be understood that various modifications and changes in form or detail could readily be made without departing from the spirit of the invention. It is therefore intended that the invention may not be limited to the exact form and detail shown and described herein, nor to anything less than the whole of the invention disclosed herein and as claimed herein after. Further, the features described in the description, the drawings and the claims disclosing the invention may be essential for the invention considered alone or in combination. In particular, any reference signs in the claims shall not be construed as limiting the scope of the invention. The wording "comprising" does not exclude other elements or steps. The word "a" or "an" does not exclude the plurality. The wording "a number of" items comprising also the number 1, i.e. a single item, and further numbers like 2, 3, 4 and so forth. In the accompanying drawings:

Figure 2:
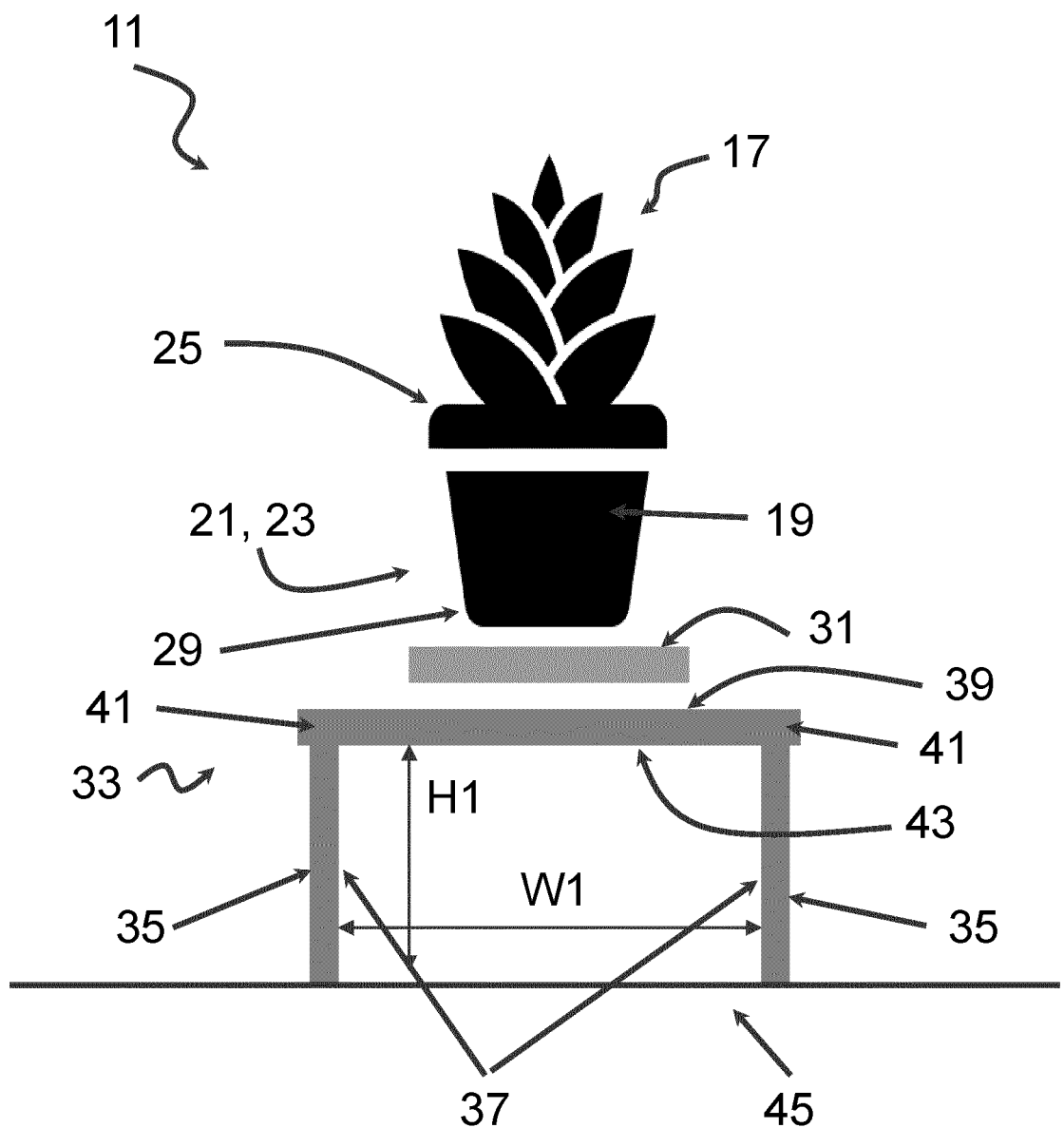
FIG. 2 shows a schematic drawing of a plant unit.

A phenotyping system 1 for phenotyping of plants 17 is located in a greenhouse 3. The phenotyping system 1 comprises a growing area 5, a measurement area 7 and an acclimatisation area 9. Multiple plant units 11 are arranged in the growing area 5 in a matrix of rows 13 and columns 15. A plant 17 of the plant unit 11 is implanted into soil 19 of container 21 (FIG. 2). Here the container 21 is a pot 23. The soil 19 is fully covered by a soil cover 25. The soil cover 25 provides a uniform background for phenotyping of the plant and reduces evaporation of water contained in the soil 19. In order to allow additives and or water to enter or leave, the pot 23 has holes (not shown in FIG. 2) in its base 29. The pot 23 sits on a saucer 31 that is constructed such that all water provided flows towards the base 29 of the container 21. In this embodiment the pot 23 and the saucer 31 are fixed to a support 33 of the plant unit 11. Preferably, the pot 23 and/or the saucer 31 are releasable fixed to the support 33 with screws, wires or a clamping mechanism (not shown in FIG. 2). It is further preferred that the support 33 comprises a frame surrounding the pot 23 and or saucer 31. The legs 35 of support 33 are spaced at a minimum free leg width W1. The free leg width W1 is measured between inside faces 37 of adjacent legs 35. Preferably, a support platform 39 of the support 33 is rectangular and the support 33 comprises four legs 35 positioned at corners 41 of said support platform 39. Here the support platform 39 is square such that the leg width W1 is constant. A height H1 of the support 33 is measured between an underside 43 of the support platform 39 and the ground 45 of the greenhouse 3, wherein the underside 43 is a side of the support platform 39 facing the ground 45. The legs 35 of the support 33 can be adjustable such that the height H1 is variable.

Figure 3:
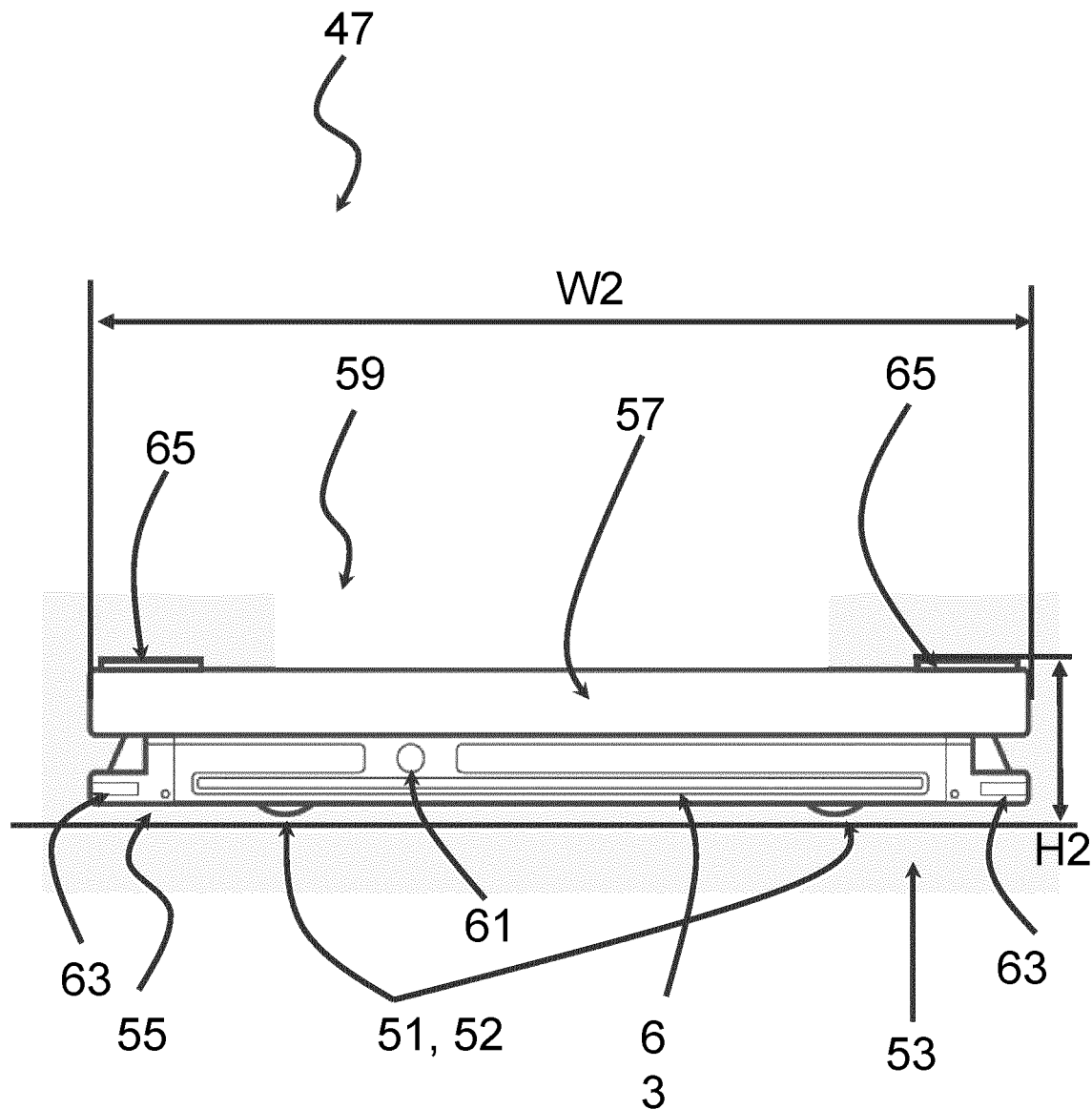
FIG. 3 shows a schematic drawing of a plant vehicle.

The phenotyping system 1 comprises multiple plant vehicles 47 and multiple weighing vehicles 49. In this embodiment the plant vehicles 47 and the weighing vehicles 49 are automated guided vehicles. It shall be noted that the phenotyping system 1 preferably further comprises an irrigation vehicle, particularly preferred an automated guided irrigation vehicle. An automated guided vehicle is a robot that uses radio waves, magnets, gyroscopic sensors, GPS, optical cameras and/or laser for navigation and/or follows marked paths on the floor. Automated guided vehicles can be controlled individually by an on-board control unit and/or controlled centrally by a main controller 91 of the phenotyping system 1. Preferably, the plant vehicles 47 and/or weighing vehicles 49 are each powered by a rechargeable battery. Wheels 51 protrude from a main body 55 of the plant vehicle 47 on a drive side 53 (FIG. 3). Preferably, the wheels 51 are formed as independent driven steering wheels 52 such that the plant vehicle 47 can move omnidirectional and turn on the spot. A lifting platform 57 of the plant vehicle 47 is movable relative to a main body 55. In order to lift a plant unit 11 positioned on a lifting side 59 of the lifting platform 57, a height H2 of the plant vehicle 47 measured between the lifting side 59 and the ground 45 can be increased. Therefore, the lifting platform 57 is lifted relative to the main body 55 and a distance between the lifting side 59 and the drive side 53 is increased. The lifting side 59 is a side of the plant vehicle 47 opposite the drive side 53. In a non-lifting state, the height H2 of the plant vehicle 47 is smaller than the corresponding height H1 of the support 33 of the plant unit 11. In a lifting state the lifting platform 57 is lifted and a height H2 of the plant vehicle 47 is larger than the corresponding height H1 of the support 33. Consequently, a plant unit 11 located above the plant vehicle 47 is lifted from the ground 45 via the lifting platform 57. Therefore, the lifting side 59 contacts the underside 43 of the support platform 39 (not shown). In this embodiment in order to operate autonomously the plant vehicle 47 comprises safety sensors 63 and an on-board control unit (not shown in FIG. 3). It is preferred that the plant vehicle further comprises a camera system. The lifting platform 57 comprises damping elements 65 to reduce vibrations. A width W2 of the plant vehicle 47 measured perpendicular to height H2 is smaller than the free leg width W1 of the plant unit 11. Thus, the plant vehicle 47 is adapted to move between the legs 35 and beneath the support platform 39 of the plant unit 11 in the non-lifting state.

In this embodiment the weighing vehicles 49 are formed as plant vehicles 47 with an additional weighing unit 66 (not shown in FIG. 3). Preferably, the weighing unit 66 is located between the main body 55 and the lifting platform 57. It is also preferred that the weighing unit 66 is positioned on top and/or integrated in the lifting platform 57. The weighing unit 66 is adapted to acquire weight-data related to the weight of the plant unit 11 when the plant unit 11 is lifted with the lifting platform 57. As indicated by arrows A1 in FIG. 1 the weighing vehicles 49 drive beneath the plant units 11. When weight-data related to the weight of a plant unit 11 is to be collected, a weighing vehicle 49 drives underneath said plant unit 11, lifts said plant unit 11 with its lifting platform 57 and acquires the weight-data. The plant unit 11 is then lowered to the ground 45 and the weighing vehicle 49 moves on to the next plant unit 11. Preferably, the weighing vehicle 49 moves to an adjacent plant unit 11 of row 13 or column 15. Here a time interval between two consecutive weight-data acquisitions for a specific plant unit 11 is 10 minutes or less.

Figure 1:
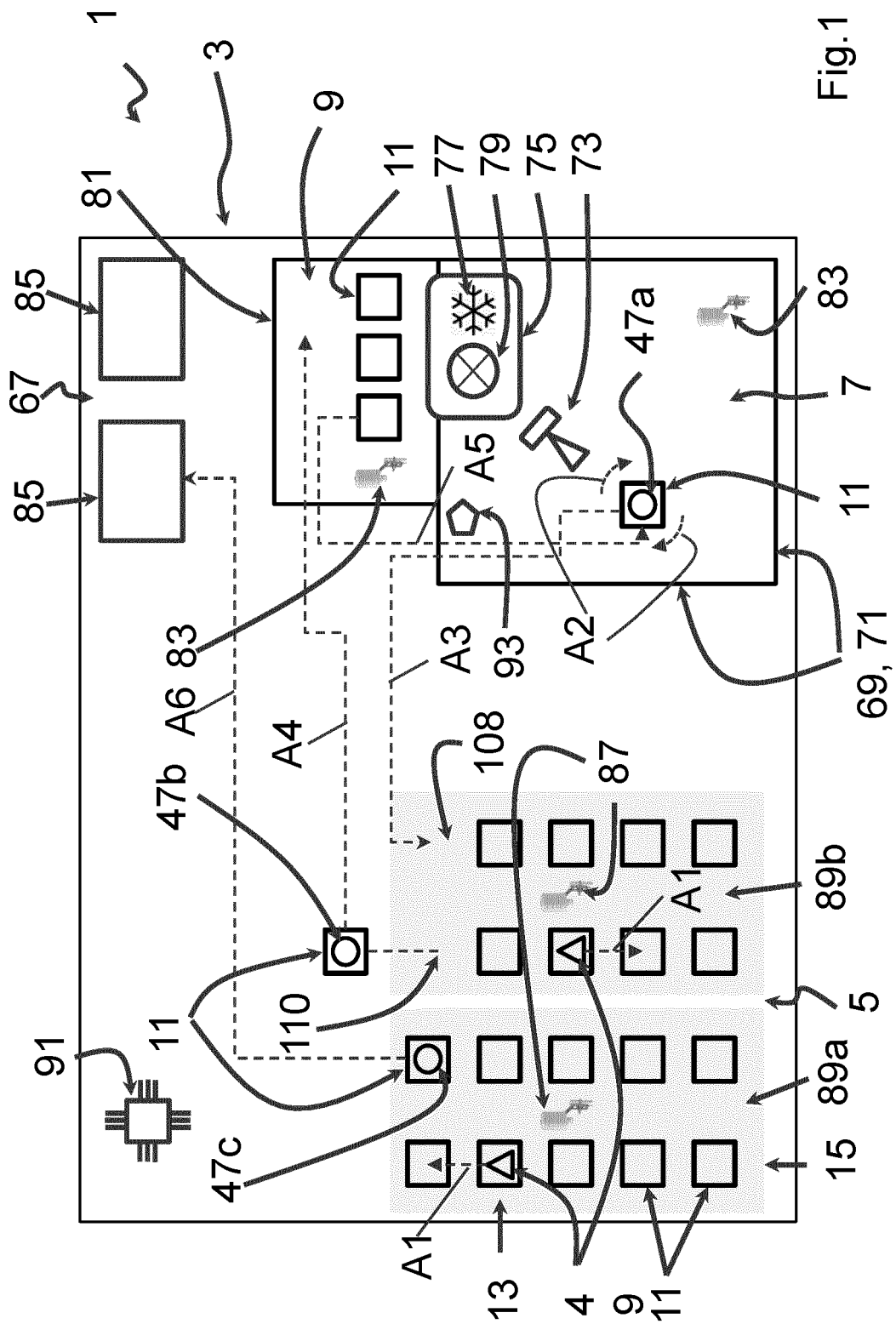
FIG. 1 shows a schematic top view of a phenotyping system.

As indicated in FIG. 1 plant units 11 are transported in the phenotyping system 1 by plant vehicles 47. For this purpose, a plant vehicle 47 drives under a plant unit 11 to be transported and lifts it up. The plant vehicle 47 then transports the plant unit 11 to the measurement area 7, the acclimatisation area 9, the growing area 5 or to an irrigation system 67. Since the plant vehicles 47 are configured to transport individual plant units 11 a layout of the phenotyping system 11 is flexible. A number of plant units 11 per row 13 and/or column 15 as well as a distance between rows 13 and/or columns 15 can be easily varied. It is further possible to vary the size of the plant units 11 and or to combine different types of plant units 11 in the phenotyping system 1.

Preferably, the weighing vehicles 49 are adapted to acquire weight-data related to the weight of different sized plant units 11 and/or the plant vehicles 47 are adapted to transport different sized plant units 11.

The measurement area 7 is an enclosure 69 formed by walls 71. An opening and/or a gate (not shown in FIG. 1) in at least one of the walls 71 allows for transportation of the plant units 11 to the measurement area 7. A sensor 73 for acquiring phene-data related to the phenes of a plant 17 is located in the measurement area 7. The sensor 73 preferably is a RGB sensor, spectral sensor, multispectral sensor, hyperspectral sensor, fluorescene imaging sensor, thermography sensor, and/or a camera. It should be understood that the phenotyping system 1 can comprise multiple sensors 73 of the same and/or different types. In this embodiment sensor 73 is fixed in the measurement area 7. As indicated by arrows A2 in FIG. 1, the plant unit 11 is rotated in the measurement area 7 by a first plant vehicle 47*a*. This allows for phene-data acquisition from different angular positions of the plant unit 11. A condition control system 75 is located in the enclosure 69 in order to control environmental conditions in the measurement area 7. In this embodiment the condition control system 75 comprises an air conditioning unit 77 and a measurement lighting system 79. The air conditioning unit 77 is adapted to regulate an air temperature to a predefined level while the measurement lighting system 79 is configured to provide light at a certain intensity. As indicated by arrow A3 the plant unit 11 is transported back to the growing area 5, in particular to a first location 108, by the first plant vehicle 47*a* after phene-data related to the phenes of the plant 17 has been acquired by the sensor 73. The first location 108 is a location in the growing area 5, wherein the plant unit 11 was stored before being transported to the measurement area 7. It is also preferred that the plant unit 11 is transported to a second location 110 different from the first location 108.

The acclimatisation area 9 is positioned adjacent to the measurement area 7. Plant units 11 are transported from the growing area 5 to the acclimatisation area 9 by a second plant vehicle 47*b* (indicated by arrow A4 in FIG. 1). The acclimatisation area 9 is separated from the growing area 5 by separation walls 81. It should be understood that the measurement area 7 and/or the acclimatisation area 9 can comprise a roof. In this embodiment environmental conditions in the acclimatisation area 9 are controlled such that these are similar to environmental conditions in the measurement area 7. For this purpose, the condition control system 75 also controls environmental conditions in the acclimatisation area 9. It is also preferred that environmental conditions in the acclimatisation area 9 are controlled by an acclimatisation condition control system. For measuring environmental conditions the environmental control system comprises control sensors 83. Multiple plant units 11 are located in the acclimatisation area 9. In order to acclimatise the plants 17 of the plant units 11 to the environmental conditions in the measurement area 7, the plant units 11 are stored in the acclimatisation area 9 for a minimum period. The minimum period is in a range from more than 0 to 60 minutes, preferred 10 to 30 minutes, particularly preferred 15 to 20 minutes. As indicated by arrow A5 the plant unit 11 is transported to the measurement area 7 when the minimum period has passed.

In this embodiment the phenotyping system 1 comprises a stationary irrigation system 67. As indicated by arrow A6 a third plant vehicle 47*c* transports the plant units 11 to the irrigation system 67 for irrigation of the plants 17 with water and/or additives. Water and/or additives are dosed to the plant unit using a metering unit (not shown in FIG. 1) of the irrigation system 67. Here an amount of water and/or additives to be provided to the plant 17 is selected by the main controller 91 on the basis of weight-data related to the weight of the plant unit 11 acquired by the weighing vehicle 49. It is also possible that a weighing vehicle 49 transports the plant unit 11 to the irrigation system 67 and acquires weight-data related to the weight of the plant unit 11, while the plant 17 is irrigated. An amount of water and/or additives provided to the plant 17 can then be monitored using the weight-data acquired by the weighing vehicle 49. The irrigation system 67 comprises two irrigation stations 85 such that two plants 17 can be irrigated at the same time. It should be understood that tasks assigned to the first plant vehicle 47*a*, the second plant vehicle 47*b* and/or the third plant vehicle 47*c* are flexible such that the plant vehicles 47*a*, 47*b* and/or 47*c* can change functions. For example, it is possible that the first plant vehicle 47*a* first transports a plant unit 11 from the growing area 5 to the acclimatisation area 9 before lifting another plant unit 11 and transporting it from the acclimatisation area 9 to the measurement area 7.

For measuring environmental conditions in the growing area 5, environmental sensors 87 are positioned therein. Here the growing area 5 is divided into two subareas 89*a*, 89*b*, wherein an environmental sensor 87 is located in each subarea 89. In this embodiment the environmental sensors 87 are fixed in the subareas 89. Preferably, the environmental sensors 87 are positioned above the plant units 11 such that the plant units 11 can be moved freely. It is also preferred that the environmental sensors 87 are movable between the subareas 89.

Figure 4:
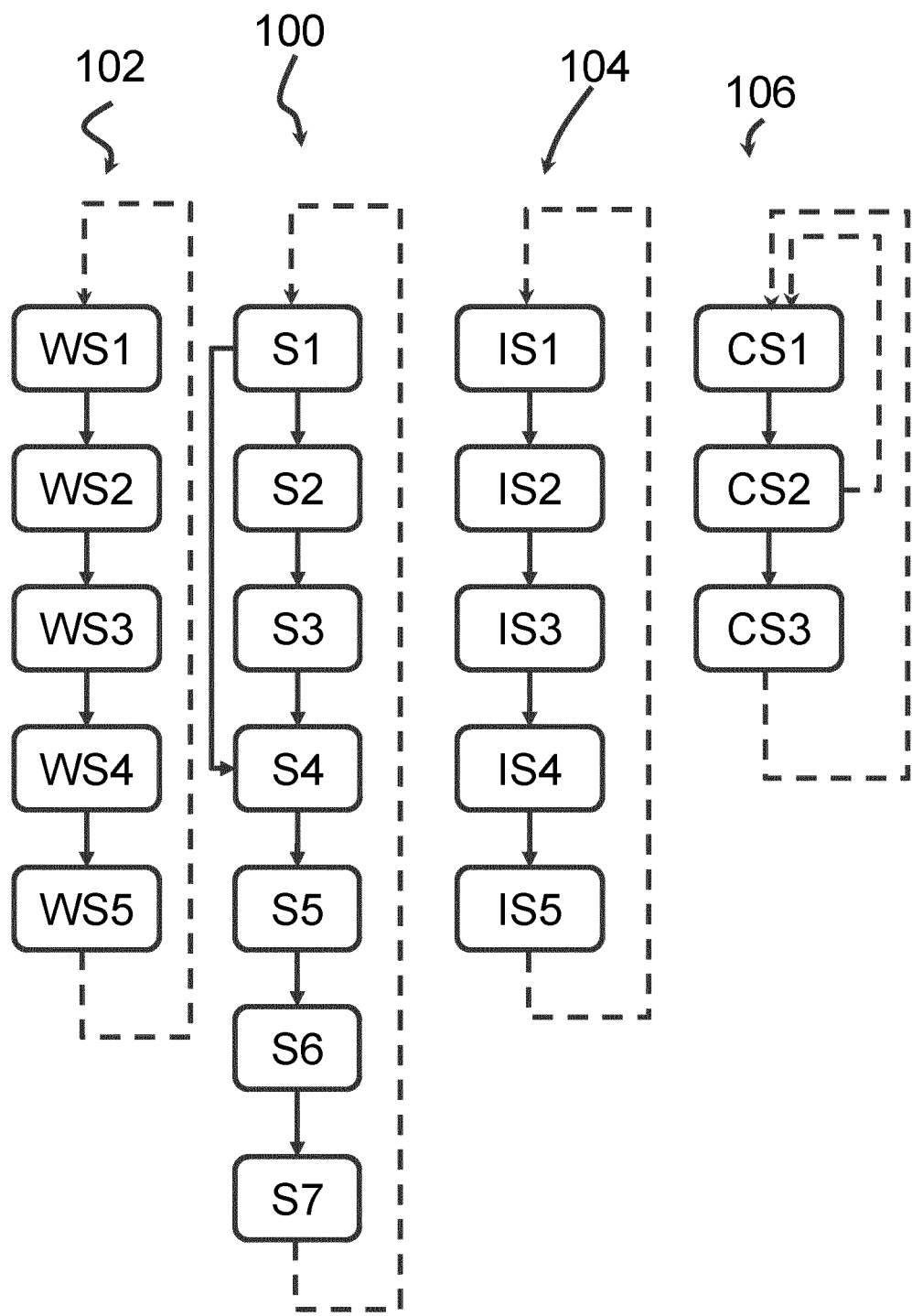
FIG. 4 shows a flow chart describing a method for phenotyping of plants.

Now referring to FIG. 4 a method for phenotyping of plants using a phenotyping system 1 according to the second aspect of the invention is explained. The method comprises a measurement process 100, a weighing process 102, an irrigation process 104, and a climate recording process 106. In the preferred embodiment the measurement process 100, the weighing process 102, the irrigation process 104, and/or the climate recording process 106 are executed at the same time. However, it should be understood that the measurement process 100, the weighing process 102, the irrigation process 104, and/or the climate recording process 106 are repeated independently of each other. For example, a second cycle of the weighing process 102 can start even if a first cycle of the measurement process 100 is still being executed.

In a first step S1 of the measurement process 100 a plant vehicle 47 moves to a position of a plant unit 11 and lifts the plant unit 11 with its lifting platform 57. In a second step S2 the plant vehicle 47 then transports the plant unit 11 to the acclimatisation area 9. The plant unit 11 is stored in the acclimatisation area 9 for a predefined minimum period in a third step S3. During the minimum period the plant vehicle 47 can perform another task. It should be understood that it is possible to store the plant units 11 in the acclimatisation area 9 for a longer time than the minimum period. This can be the case if no plant vehicle 47 is available when the minimum period has passed. In a fourth step S4 the plant unit 11 is transported to the measurement area by a plant vehicle 47. The phenotyping system 1 can comprise multiple plant units 47 and that the term plant vehicle 47 is not limited to a specific plant vehicle 47. For example, the plant unit 11 can be transported to the acclimatisation area 9 by the second plant vehicle 47*b* and to the measurement area 7 by the first plant vehicle 47*a*. In the measurement area 7 sensor 73 acquires phene-data related to phenes of the plant 17 as a fifth step S5. Preferably, the plant unit 11 is lifted by the plant vehicle 47 during the phene-data acquisition. The plant vehicle 47 can rotate around its own axis and thus the plant unit 11 is rotated relative to the sensor 73. It is further possible that the plant unit 11 is moved back and forth in a linear motion relative to the sensor 73. Preferably, the plant vehicle 47 is adapted to perform the rotation and/or the linear movement in a stepwise and/or continuous manner. After the phene-data acquisition the phene-data is stored, preferably together with a phene-data acquisition time stamp and/or a plant unit ID, in a sixth step S6. The plant unit ID is predefined for every plant unit 11 of the phenotyping system 1. Preferably, a plant unit ID is stored on a chip of the plant unit and is readable with a scanner unit 93 located in the measurement area 7. It is also preferred that the plant unit ID is a digital ID which is stored in a database. A location of the plant unit is then preferably related to the plant unit ID via the main controller 91. It is further preferred that the phene-data related to phenes is transmitted to a main controller 91 of the phenotyping system 1 and stored therein. In a seventh step S7 the plant unit 11 is returned to the growing area 5 by the plant vehicle 47. In this embodiment a new location in the growing area 5 is chosen for the plant unit 11. Preferably, the new location is the closest available location relative to the measurement area 7. It is also possible that the new location is chosen dependent of environmental conditions in the growing area 5 and/or chosen according to a randomisation scheme.

After the plant unit 11 has been placed in the growing area 5, information about the new location is stored in the main controller 91. After completing step S7 the process can be repeated for the same plant unit 11 or another plant unit 11. It is further preferred that steps S1 to S7 are performed parallel for multiple plant units 11 of the phenotyping system 1. In some cases, no acclimatisation of the plant 17 in the acclimatisation area 9 is needed. For example, this can be the case if environmental conditions in the growing area 5 are similar or equal to environmental conditions in the measurement area 7. If no acclimatisation of the plant 17 is needed, steps S2 and S3 are omitted.

To execute the weighing process 102 a weighing vehicle 49 of the phenotyping system 1 performs weighing steps WS1 to WS5 (FIG. 4). First the weighing vehicle 49 moves to a location of a plant unit 11 of which weight-data related to the weight shall be acquired (weighing step WS1). In a second weighing step WS2 the weighing vehicle 49 lifts the plant unit 11 with its lifting platform 57. When the plant unit 11 is completely supported by the weighing vehicle data related to the weight of the plant unit 11 is acquired by the weighing unit 66 of the weighing vehicle 49 (weighing step WS3). Then the acquired weight-data related to the weight of the plant unit 11 is stored, preferably together with a plant unit ID and/or a weighing time stamp, in a fourth weighing step WS4. Preferably, the acquired weight-data, the weighing time stamp and plant unit ID are wirelessly sent to the main controller 91 for storing. In a fifth weighing step WS5 the lifting platform 57 and the plant unit 11 are lowered. After completing weighing step WS5 the process is repeated for the same or another plant unit 11 of the phenotyping system 1. Preferably, weighing steps WS1 to WS 5 are executed in parallel by multiple weighing vehicles 49 of the phenotyping system 1.

In the first irrigation step IS1 of the irrigation process 104 a plant vehicle 47 moves to the location of a plant unit 11 and lifts said plaint unit 11 with its lifting platform 57. Then the plant unit 11 is transported to an irrigation station 85 of the irrigation system 67 (irrigation step IS2). During the third irrigation step IS3 the plant 17 is irrigated with water and/or additives. Preferably, an amount of water and/or additives supplied to the plant 17 is defined based on weight-data related to the weight of the plant unit 11 acquired during the weighing steps WS1 to WS5. A metering unit 95 of the irrigation station 85 doses the defined amount of water and/or additives to the saucer 31 of the plant unit 11. The water and/or additives enter the container 21 through the holes 27 in the base 29 of the pot 23. If no soil cover 25 covers the soil 19 of the plant unit 11 it is also possible to dose the defined amount of water and/or additives directly to the soil 19. After the third irrigation step IS3 is completed, irrigation-data related to the amount of water and/or additives provided to the plant unit 11 is stored, preferably together with a plant unit ID and an irrigation time stamp (irrigation step IS4). Preferably, the irrigation-data related to the amount of water and/or additives provided to the plant unit 11, the irrigation time stamp, and the plant unit ID are transmitted to the main controller 91 for storing. Then the plant unit 11 is returned to the growing area 5 by the plant vehicle 47 (irrigation step IS5). In this embodiment a new location in the growing area 5 is chosen for the plant unit 11. Preferably, the new location is the closest available location relative to the irrigation system 67. It is also possible that the new location is chosen dependent of environmental conditions in the growing area 5. After the plant unit 11 has been placed in the growing area 5, information about the new location is stored in the main controller 91.

In a first climate recording step CS1 of the climate recording process 106 the environmental sensor 87 acquires environmental-data related to environmental conditions in the growing area 5. Then the acquired environmental-data is stored, preferably together with a climate time stamp and/or information regarding the location of the environmental sensor during the data acquisition (climate recording step CS2). Preferably, the acquired environmental-data related to the environmental conditions, the climate time stamp and the information regarding the location are transferred to the main controller 91 for storing. In a third climate recording step CS3 the environmental sensor 87 moves to another location in the measurement area 7. Preferably, climate recording steps CS1 to CS3 are repeated for every subarea 89 of the growing area 5. If the environmental sensor 87 is fixed in the growing area 5, climate recording step CS3 is omitted. In this case it is possible that no information regarding the location of the environmental sensor is stored.

| | |
|---|---|
| 1 | Phenotyping system |
| 3 | Greenhouse |
| 5 | Growing area |
| 7 | Measurement area |
| 9 | Acclimatisation area |
| 11 | Plant unit |
| 13 | rows |
| 15 | Columns |
| 17 | Plant |
| 19 | soil |
| 21 | container |
| 23 | Pot |
| 25 | soil cover |
| 27 | |
| 29 | base |
| 31 | saucer |
| 33 | support |
| 35 | Legs |
| 37 | Inside faces |
| 39 | Support platform |
| 41 | Corners support platform |
| 43 | Underside support platform |
| 45 | ground |
| 47 | Plant vehicle |
| 47a | First plant vehicle |

-continued

| | |
|---|---|
| 47b | Second plant vehicle |
| 47c | Third plant vehicle |
| 49 | Weighing vehicle |
| 51 | Wheels |
| 52 | Independent driven steering wheels |
| 53 | Drive side main body |
| 55 | Main body |
| 57 | Lifting platform |
| 59 | Lifting side |
| 63 | Safety sensors |
| 65 | Damping elements |
| 66 | Weighing unit |
| 67 | Irrigation system |
| 69 | enclosure |
| 71 | walls |
| 73 | sensor |
| 75 | Condition control system |
| 77 | Air conditioning unit |
| 79 | Measurement lighting system |
| 81 | Separation walls |
| 83 | Control sensors |
| 85 | Irrigation station |
| 87 | Environmental sensor |
| 89 | subarea |
| 91 | Main controller |
| 93 | Scanner unit |
| 95 | Metering unit |
| 100 | Measurement process |
| 102 | Weighing process |
| 104 | Irrigation process |
| 106 | Climate recording process |
| 108 | First location |
| 110 | Second location |
| H1 | Height support |
| H2 | Height plant vehicle |
| W1 | Leg width |
| W2 | Width plant vehicle |

The invention claimed is:

1. A phenotyping system for phenotyping of plants, the system comprising:
    at least one plant unit comprising:
        one or more plants,
        a growing area,
        a measurement area separated from the growing area,
        an acclimatisation area separated from the growing area,
        a sensor located in the measurement area configured to acquire phene-data related to phenes of the one or more plants of the at least one plant unit,
    a main controller for receiving and processing data, and
    at least one weighing vehicle comprising a weighing unit, the weighing vehicle configured to autonomously navigate to a location of the at least one plant unit to acquire weight-data related to the at least one plant unit,
    wherein the phenotyping system is configured to:
        transport the plant unit to the acclimatisation area for a predetermined time period such that the plant unit acclimatises to one or more first environmental conditions of the measurement area before being transported to the measurement area; and
        transport the plant unit to the measurement area.

2. The phenotyping system according to claim 1, wherein the weighing vehicle is an automated vehicle.

3. The phenotyping system according to claim 1, wherein the weighing vehicle is configured to selectively lift the plant unit in order to acquire weight-data related to the weight of said plant unit.

4. The phenotyping system according to claim 1, further comprising an irrigation system configured to irrigate the one or more plants with water and/or additives based at least on the weight-data related to the weight of the plant unit.

5. The phenotyping system according to claim 4, wherein weight-data related to the weight of the plant unit is acquired by the weighing unit of the weighing vehicle while the one or more plants of the plant unit are irrigated.

6. The phenotyping system according to claim 4, wherein the plant unit is transported to the irrigation system for irrigating the one or more plants.

7. The phenotyping system according to claim 1, wherein the phenotyping system is configured to acquire weight-data related to the weight of the plant unit at a weighing time interval, to acquire phene-data related to the phenes of the one or more plants of said at least one plant unit at a sensor acquisition time interval and wherein the weighing time interval is equal to or shorter than the sensor acquisition time interval, and wherein the weighing time interval is 60 minutes or less.

8. The phenotyping system according to claim 1, wherein the at least one weighing vehicle is configured to navigate to the location without a guide path.

9. The phenotyping system according to claim 1, wherein the at least one weighing vehicle is adapted to circumnavigate one or more obstacles in its route, and wherein the at least one weighing vehicle comprises a safety system.

10. The phenotyping system according to claim 1, wherein:
    the at least one plant unit further comprises:
        a support platform;
        a container removably attached to the support platform and comprising soil;
        a soil cover configured to provide a uniform background for phenotyping and to reduce evaporation of water contained within the soil; and
        a saucer and a frame surrounding the saucer, container, or both,
            wherein the one or more plants are disposed in the soil of the container,
            wherein the container comprises a base with holes configured to facilitate the addition of additives or the removal of water and the base is positioned within the saucer, and
            wherein the saucer is removably attached to the support platform.

11. The phenotyping system according to claim 1, wherein the predetermined time period is between approximately 0 to 60 minutes.

12. The phenotyping system according to claim 1, further comprising:
    a first plant vehicle; and
    a second plant vehicle different from the first plant vehicle,
        wherein the phenotyping system transports the plant unit to the acclimatisation area via the first plant vehicle, and
        wherein the phenotyping system transports the plant unit to the measurement area via the second plant vehicle.

13. The phenotyping system according to claim 1, wherein the sensor comprises a hyperspectral imaging sensor.

14. The phenotyping system according to claim 13, wherein the hyperspectral imaging sensor is integrated into a push broom scanner.

15. The phenotyping system according to claim 1, wherein the sensor comprises a multispectral sensor contained in a measurement device.

16. The phenotyping system according to claim 15, wherein the measurement device comprises a spectrograph imaging unit, a monochrome camera, or both.

17. A method for phenotyping of plants using a phenotyping system, the method comprising:
 a) acquiring weight-data related to a weight of a plant unit with a weighing vehicle configured to autonomously:
  navigate to a location of the plant unit to acquire the weight-data,
   wherein the plant unit comprises;
    one or more plants;
 b) transporting the plant unit from a first location in a growing area to an acclimatisation area such that the plant unit acclimatises to one or more first environmental conditions of a measurement area before being transported to the measurement area;
 c) transporting the plant unit from the acclimatisation area to the measurement area; and
 d) acquiring phene-data related to phenes of one or more plants of the plant unit in the measurement area.

18. The method according to claim 17, further comprising:
 measuring an environmental condition in the growing area;
 determining at least one phene of the one or more plants of the plant unit based on the phene-data and the measured environmental condition; and
 temporally associating the determined phene with a calculated transpiration of the one or more plants of the plant unit.

19. The method according to claim 17, wherein step a) is executed at a higher or equal temporal resolution than step c) and d), and wherein the temporal resolution of step a) is 60 minutes or less.

20. A phenotyping system for phenotyping plants, the system comprising:
 at least one plant unit comprising
  one or more plants,
 a growing area,
 a measurement area separated from the growing area,
 an acclimatisation area separated from the growing area,
 a sensor located in the measurement area configured to acquire phene-data related to phenes of the one or more plants of the at least one plant unit,
 a main controller for receiving and processing data,
 at least one weighing vehicle comprising a weighing unit,
 one or more processors, and
 memory in communication with the one or more processors and storing instructions that, when executed by the one or more processors, are configured to cause the system to:
 a) acquire weight-data related to a weight of the at least one plant unit with the at least one weighing vehicle configured to autonomously:
  navigate to a location of the at least one plant unit to acquire the weight-data;
 b) transport the at least one plant unit from a first location in the growing area to the acclimatisation area such that the at least one plant unit acclimatises to one or more first environmental conditions of the measurement area before being transported to the measurement area;
 c) transport the at least one plant unit to the measurement area; and
 d) acquire the phene-data related to the phenes of the one or more plants of the at least one plant unit in the measurement area.

* * * * *